April 15, 1930.  J. A. OLSON  1,754,764

FLUID SEALING MEANS

Filed May 18, 1929

INVENTOR
JOHN A. OLSON.
BY Richey & Watts
ATTORNEY

Patented Apr. 15, 1930

1,754,764

UNITED STATES PATENT OFFICE

JOHN A. OLSON, OF CLEVELAND, OHIO, ASSIGNOR TO RUTH M. OLSON, OF CLEVELAND, OHIO

FLUID-SEALING MEANS

REISSUED

Application filed May 18, 1929. Serial No. 364,035.

My invention relates to fluid pressure devices and more particularly to a piston for use in hydraulically operated mechanisms.

An object of my invention is to provide an improved piston, having an annular portion, for exerting pressure on a confined liquid, capable of conforming to a confining cylinder to prevent escape of fluid past the piston.

Another object of my invention is to construct a piston which will adjust itself to conform to the cylinder in which it reciprocates to prevent escape of fluid pressure therepast when pressure is applied to the fluid in the cylinder.

It will be understood that the following description of the accompanying drawings of the preferred embodiments of my invention is to be taken as illustrative of one method of applying the principle thereof but not in a limited sense.

The aforementioned objects and other objects of the invention itself will become apparent from the following description of an embodiment. In the description reference will be had to the accompanying drawings forming a part of the specification.

Figure 1:
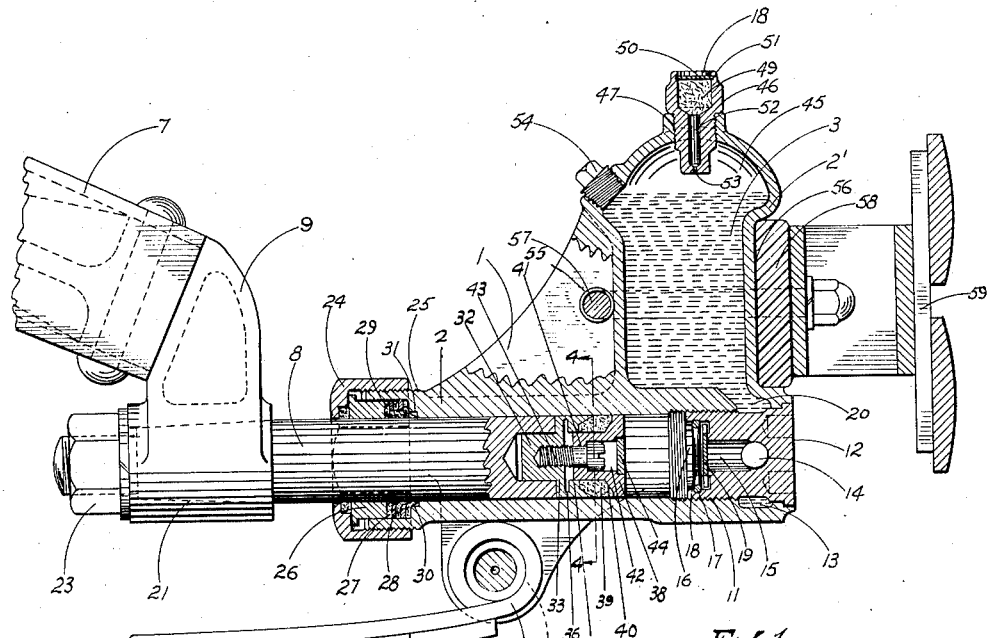
Figure 1 is a vertical, medial, sectional view of a shock absorber embodying the principles of my invention, a fragment of an automotive vehicle frame, a bumper and spring being shown attached thereto.

As best shown in Figure 1 my invention is illustrated as applied to a motor vehicle shock absorber which may conveniently comprise an integral housing provided with a horizontal cylinder 2 in the lower portion and a reserve supply reservoir 3 disposed above the cylinder with a strengthening web 1 disposed in the angle between the cylinder and reservoir. The device is supported by the spring 4, the eye-leaf 5 of the spring being oscillatably pinned to a pair of ears 6 depending from the housing, which are provided with axially aligned apertures therefor. The vehicle frame 7 is supported by a piston or plunger rod 8, the end of which is disposed in a suitable hanger 9 which is secured to the frame.

The piston or plunger rod 8 carries at its free end a piston assembly which is adapted to be disposed in fluid-tight engagement with the walls of the cylinder 2, the cylinder being disposed in the lower portion of the housing in a horizontal position. The cylinder is threaded at 11 and the end is adapted to be closed by a suitable plug 12 screwed therein.

The cylinder is provided with an annular recess 13 adjacent the front end to provide a fluid passage which is adapted to communicate with a transverse canal 14 within the plug 12, and which canal communicates with a longitudinal bore 15. The inner end of the plug is provided with an enlarged counterbore 16 which has in its intermediate portion an annular groove 17 adapted to seat a split-ring 18 which is adapted to retain a plate 19 loosely against the opening of the bore 15. The plate 19 acts as a flapper valve allowing fluid to pass into the cylinder around the edges thereof but restricting the fluid when it tends to flow in the opposite direction. Fluid may pass from the reservoir 3 through the port 20 disposed at the lower end of the reservoir into the passages 13, canal 14 and bore 15 passed the valve 19 which as described acts as a check valve.

The piston rod 8 is provided with a tapered end 21 adapted to be seated in a tapered recess in the lower end of the hanger 9 and is secured to the hanger by a nut 23 screwed upon the threaded end of the rod.

The cylinder is provided with an enlarged counterbore adjacent the end and the other end of the rod extends through the counterbore into the cylinder. A suitable packing nut 24 is screwed upon an externally threaded end 25 of the cylinder. A flanged thrust bushing 26 is disposed within the packing nut with the flanged end of the bushing engaged by the inner end wall of the packing nut. The bushing is adapted to be pressed into engagement with a plurality of packing washers, 27 and 28. Each washer 27 comprises an annular portion 29 and longitudinally disposed relatively short tapered lip 30 adjacent the central aperture and which is adapted to surround the rod to contact therewith. Interposed between each of the like washers 27 are plain flat washers 28 having a relatively large bore which are adapted to space the members 27. Pressure of the bushing upon the washers 27 causes the lip of each washer to telescope through the enlarged bore of the plain washers to engage the rounded inner portion opposite the lip edge in such a manner that the lip is pressed into firm contact with the surface of the piston rod 8 holding the same in fluid-tight engagement with the rod. The lip on the last washer is engaged by the edge of the annular recess 31. The lips of the washers being trained in the direction toward the free end of the rod serve with a scraping action, to prevent the escape of fluid therefrom.

A piston which comprises a stem 32 and piston body 33 is secured to the end of the rod 8 with the stem 32 disposed in the axial bore of the rod. The body is of generally cup-shape with the side wall tapered toward the forward edge, as best shown in Figure 1. An inwardly extending annular flange 35 is provided spaced from the bottom of the cup which is undercut at 36 to form an annular groove. The walls of the cup adjacent the edge of the groove are relatively thin and a plurality of V-shaped notches 37 are provided in the wall which extend longitudinally along the inner side of the wall of the piston and are adapted to connect with the groove 36 in such a manner as to weaken the wall so that a plurality of minute cracks 33' are formed in the periphery of the piston to render the wall of the piston highly resilient.

An annular packing 39 which may be made of asbestos material or the like, of irregular cross sectional shape is provided and is adapted to be seated within the slanting walls of the piston abutting the flange 35. An expander head 38 holds the packing within the cup against the flange 35 and is provided with a slanting wall 40 adapted to contact with the packing substantially as shown. The stem 32 of the piston which is disposed in the bore of the rod is provided with a threaded axial bore and the head 38 is also axially bored at 41, having an enlarged counterbore 42, to receive the head of the screw 43 which is disposed in the bore 41 and screwed into the axially threaded bore of the piston to hold the expanding head on the end of the piston. The end of the counterbore 42 may be closed by a plug 44. The construction described is such that the head of the piston may be moved relative to the body of the piston in such a manner as will cause the converging walls of the expander to force the packing into the piston forcing the resilient wall of the piston into fluid-tight engagement with the cylinder.

The construction of the reservoir 3 is such as to provide an air chamber 45 above the fluid and to also permit gradual equalization of pressure between the air in said chamber and the atmosphere.

Air may enter through a hollow plug 46 which is screwed into a suitable threaded aperture 47 in the top of the reservoir. The plug is provided with an axial bore from end to end on three different diameters, the uppermost and largest bore 48 provides a receptacle to receive a dust-straining material, such as fibrous material 49, which in turn are held in place by a perforated plate 50, which may in turn be snapped into position in an annular groove 51 adjacent in the top of the plug. A relatively smaller bore 52 is provided below the larger bore and connected thereto and connects with a restricted passage 53 in the end of the plug of such a size as to permit slow passage of air therethrough and which is not large enough to interfere with the cushioning effect caused by the compression of air above the level of the fluid in the cylinder 3, but permits sufficient air to seep into the chamber to prevent the formation of a vacuum should some of the liquid therein be lost.

The plug may be utilized as a filling plug but it is ordinarily found preferable to fill the reservoir by removing another plug 54 which is screwed into a threaded aperture in the side of the reservoir and which is of such a height that the liquid level may be maintained at the proper elevation without the necessity of measurement of fluid placed therein.

The web 2' may be apertured as at 55 and the reservoir formed to permit a socket 56 in order that a bumper may be attached to the reservoir by U-bolts 57 which extend around the reservoir through the web. With a rubber cushion 58 interposed between the bumper 59 and the reservoir.

Figure 2:
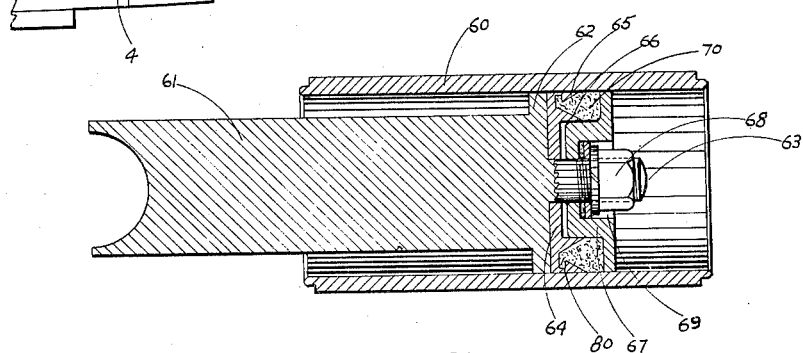
Figure 2 is a longitudinal medial sectional view of another embodiment of my invention.

As best shown in Figure 2, I provide an alternate type of piston which is shown disposed in a cylinder 60 which might be the sleeve or cylinder of a hydraulic jack or the like. The piston comprises a stem 61 provided with an annular flange 62 at the end and which is also provided with an axially disposed threaded stem 63 on the end. A piston body 64 is disposed about the stem 63 and is provided with an annular projection adjacent the periphery. A groove is provided which has slanting side walls 65 and 66, the bottom of the groove being undercut at 80 to provide an annular recess in the base of the body substantially as shown. The wall 65 of the piston is provided with a plurality of V shaped grooves such as, 37, Fig. 4 as described for the other embodiment which permits minute cracks 33' to form in the periphery thereof.

The packing member 70 is disposed in the groove and the recess in such a manner that it is substantially dove-tailed into the groove. A suitable compression member 67 is adapted to be disposed about the stem 63 and telescoped into the space surrounded by the annular portion of the piston body and annular flange 67 extends over the packing adjacent to the wall of the cylinder. The member is held in position upon the stem 63 by a suitable nut 68 disposed in a central recess 69 of the compression member.

The compression member is adapted to move relative to the piston in such a manner as to compress the packing which may be of asbestos and force the walls of the piston into fluid-tight engagement with the cylinder wall.

Figures 3, 4, 5:
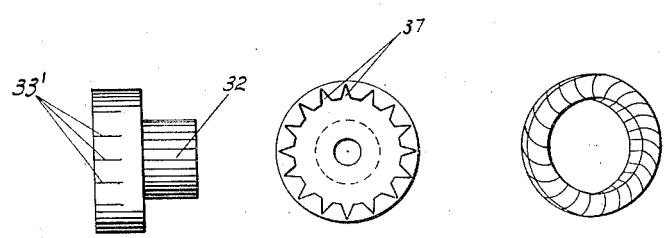
Figures 3 and 4 are side and front elevational views respectively of a packing retainer.
Figure 5 is a perspective view of a modified form of packing ring.

As best shown in Figure 5 I show another type of packing which I sometimes contemplate using in the place of those heretofore described shown and which comprises a core of asbestos or similar material surrounded by a metallic envelope of copper, lead composition or the like.

Having thus described my invention I am aware that numerous and extensive departures may be made therefrom but without departing from the spirit of my invention.

I claim:

1. A fluid pressure device comprising a cylinder and a piston movable therein, said piston having an expandable annular flange extending from one end thereof, said annular flange being weakened circumferentially near its base and also axially and having an inclined inner surface, a cap movable relatively toward and away from the piston, and packing means to prevent the ingress of fluid under pressure into the space between the cap and the piston, said packing means including a flexible packing member interposed between the flange and the cap and engaging the said inclined inner surface, to expand the flange into fluid sealing contact with the cylinder walls when fluid pressure is exerted against the cap to move the latter toward the piston.

2. A fluid pressure device comprising a cylinder and a piston movable therein, said piston having an expandable annular flange extending from one end thereof, said annular flange being weakened circumferentially near its base and also axially and having an inclined inner surface, a cap movable relatively toward and away from the piston, a cap guiding member and packing means to prevent the ingress of fluid under pressure into the space between the cap and the piston, said packing means including a flexible packing member interposed between the flange and the cap and engaging the said inclined inner surface to expand the flange into fluid sealing contact with the cylinder walls when fluid pressure is exerted against the cap to move the latter toward the piston, and a second flexible packing member interposed between and closely engaging the cap and the cap guiding member to prevent ingress of fluid under pressure into the space between the cap and the piston.

3. A fluid pressure device comprising a cylinder and a piston movable therein, said piston including a body member and a second member, the said members being movable relative to each other and providing a space therebetween, one of the members having an expanding annular flange extending toward the other member, the flange being weakened circumferentially near its base and also axially and having an inclined inner surface, and packing means to prevent the ingress of fluid under pressure into the space between the said members, said packing means including a flexible packing member interposed between the flange of one member and the other member and engaging the said inclined inner surface of the flange to expand the flange into fluid sealing contact with the cylinder wall when fluid pressure is exerted against one of the members to move the said member relative to the other member.

In testimony whereof I hereunto affix my signature this 10th day of May, 1929.

JOHN A. OLSON.